Oct. 24, 1939.  C. M. EASON  2,177,362
CLUTCH
Filed June 14, 1937  2 Sheets-Sheet 1
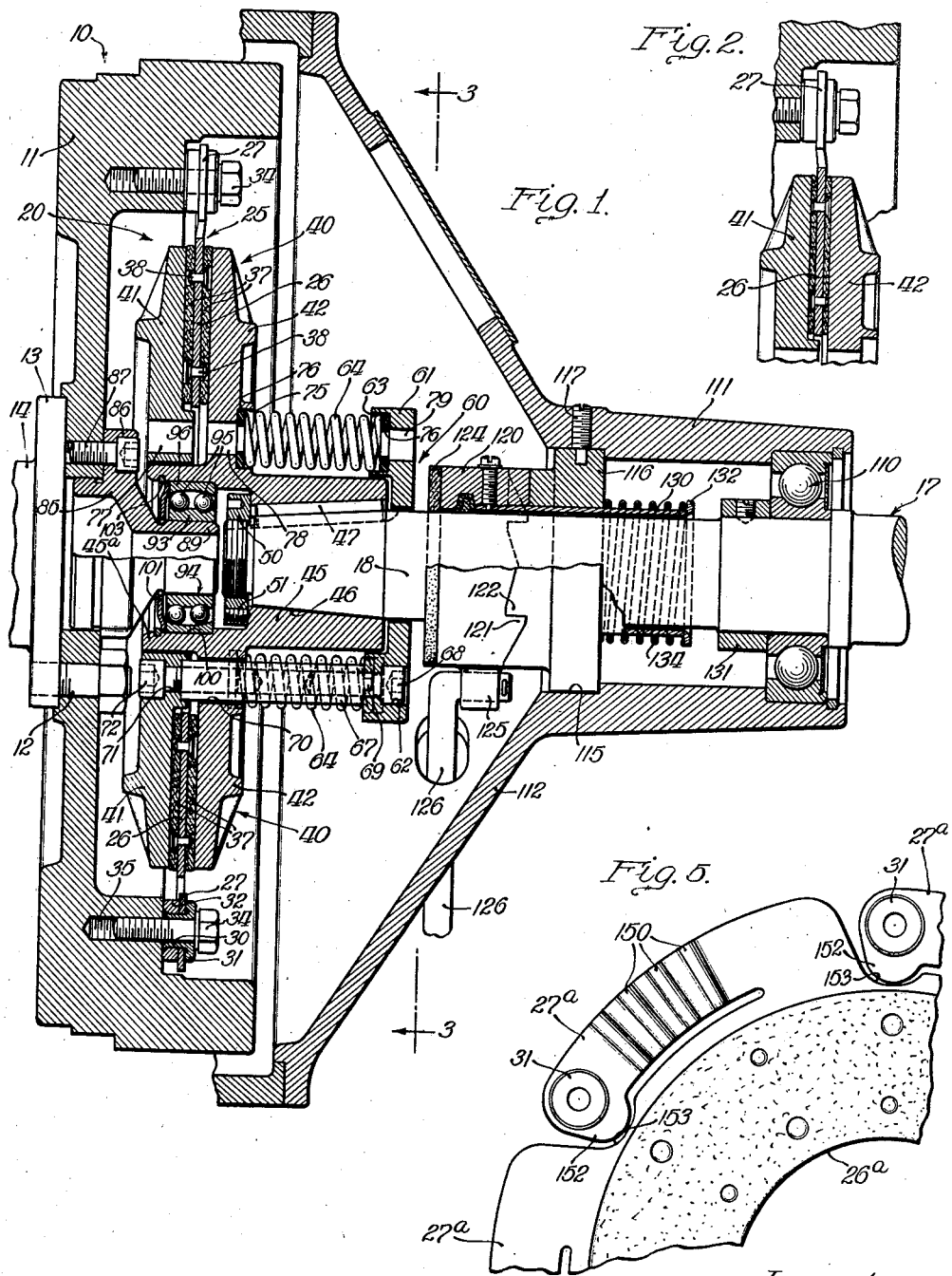
Inventor:
Clarence M. Eason
By: [signature]
Attys.

Oct. 24, 1939.    C. M. EASON    2,177,362
CLUTCH
Filed June 14, 1937    2 Sheets-Sheet 2
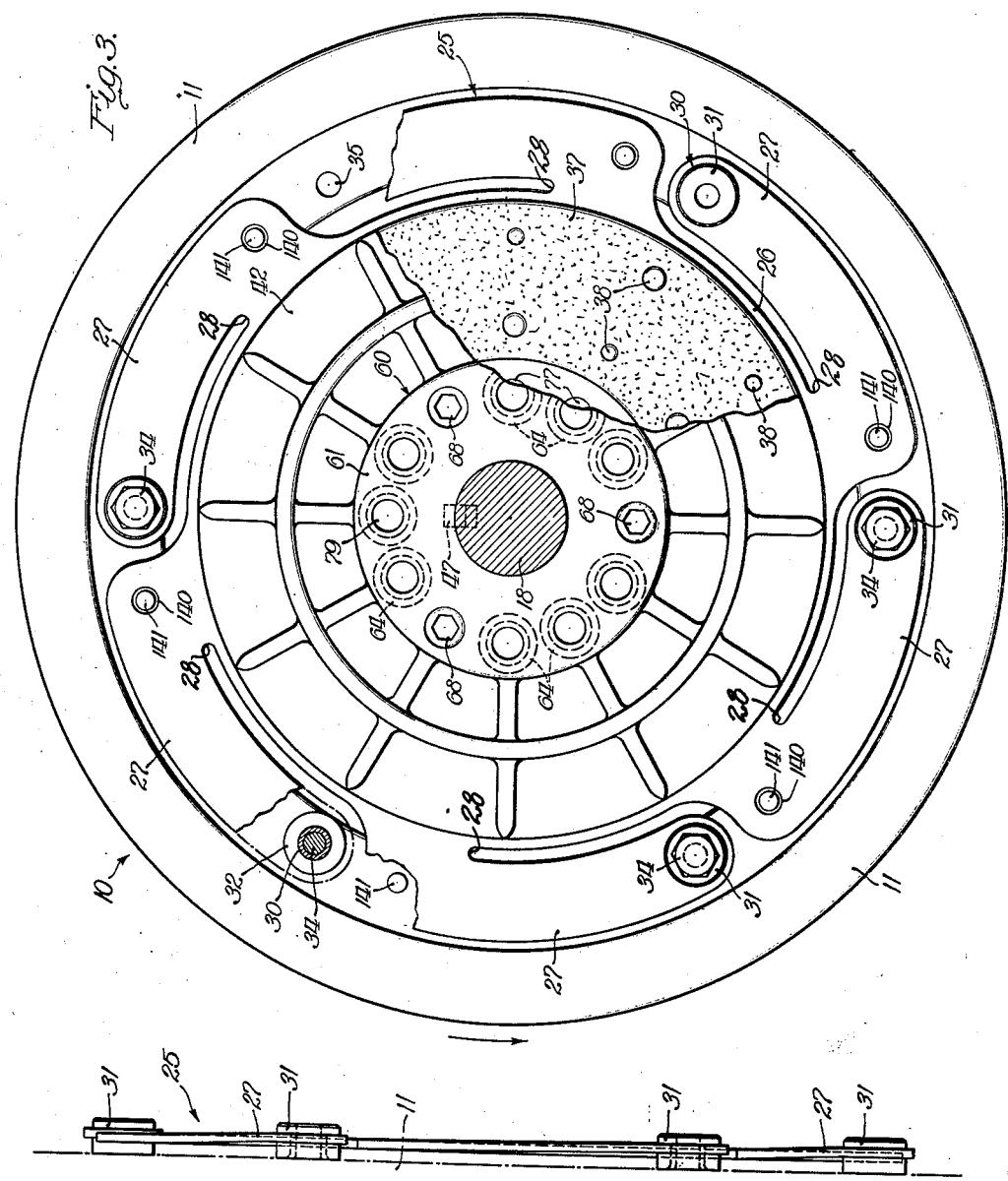
Inventor:
Clarence M. Eason
By: Brown Jackson Bötticher Brenner
Attys.

Patented Oct. 24, 1939

2,177,362

UNITED STATES PATENT OFFICE 2,177,362

CLUTCH

Clarence M. Eason, Waukesha, Wis., assignor to Industrial Clutch Company, Waukesha, Wis., a corporation of Wisconsin Application June 14, 1937, Serial No. 148,058

12 Claims. (Cl. 192—68)

The present invention relates generally to clutches for transmitting power from a driving part to a driven part, and the principal object of the present invention is the provision of a clutch mechanism which accommodates angular misalignment between the driving and driven parts and prevents the clutch parts from being subjected to any relative movement when angular misalignment is present.

It is therefore an important object of the present invention to provide a clutch structure which is especially constructed and arranged to permit rocking movement of one of the clutch members with respect to the part to which it is connected, in connection with bearing means connecting the driving and driven parts so as to insure that any misalignment between the parts will take place about the same point or axis as the rocking movement of the flexibly connected clutch part.

Specifically, it is an object of the present invention to provide a driving clutch disc having circumferentially directed spring fingers connected at their outer or free ends to a flywheel or other driving element so that the clutch disc is yieldingly mounted to rock generally about a point that coincides with the point of intersection of the plane of the clutch disc and the axis of rotation of the driving part, and it is a further object of the present invention to provide a pilot bearing receiving the driven shaft and supporting the same on the driving element so that any angular misalignment between the driving and driven elements also takes place about this same point. By virtue of this arrangement, when the clutch is engaged and any angular misalignment between the driving and driven parts exists, the driving and driven clutch elements do not tend to shift with respect to each other but move together as a unit with the driven element relative to the driving element about the aforesaid point of rocking, the spring fingers yielding to permit such relative movement.

A further object of the present invention is the provision of a driving clutch disc having generally circumferentially directed fingers or links anchored at one end to the clutch disc and adapted to be connected at their free ends to the driving element, the fingers or links being formed so that there is some resilience or yielding in a circumferential direction, thereby cushioning the transmission of torque from the driving element to the driving clutch disc. According to the present invention, the links may be formed as arcs in which the transmission of force from the driving element to the clutch disc tends to straighten the arcuate links, or the links, whether straight or arcuate, may be corrugated transversely to increase their resilience in a circumferential direction. Preferably, the curved fingers or links are integral with the portions of the clutch disc to which they are anchored. The curvature of the link merges into the curved junction between the link and the disc. This is an important feature, in that it serves to distribute the stresses which arise during operation, particularly when the driving and driven parts are displaced angularly so that the links are flexed laterally, i. e., have a wabble plate action, at the same time they are stressed in tension by the torque. This distribution of the stresses over the curved edge overcomes the tendency to tear or rupture the clutch disc at either the inner edge of the fingers or links or at the junction of the fingers or links with the disc. It is to be observed that there is a continuous curve from the outer end of the link or finger to the body of the disc. Variations of this curvature may be made, depending upon the maximum wabble plate action to be encountered. A further object of the present invention in this connection is the provision of means for limiting the amount of relative movement between the driving element and the driving clutch disc that may occur under the aforesaid yielding of the connecting links or fingers.

These and other objects and advantages of the present invention will be apparent to those skilled in the art after a consideration of the following detailed description of the preferred embodiment, taken in conjunction with the accompanying drawings.

In the drawings:

Figure 1 is a longitudinal section taken through a clutch mechanism and associated parts embodying the principles of the present invention;

Figure 2 is a fragmentary section, illustrating the relative positions of some of the parts after the clutch has become worn;

Figure 3 is an end view of the clutch structure shown in Figure 1, taken approximately along the line 3—3 of Figure 1 but omitting the clutch housing;

Figure 4 is a fragmentary edge view of the driving clutch disc shown in Figure 3; and Figure 5 is a fragmentary view, illustrating a portion of a modified form of driving clutch plate, in which the resilient circumferentially directed links or fingers are corrugated to increase the circumferential resilience.

Referring now to the drawings, more particularly Figures 1 to 4, the reference numeral 10 indicates a driving element in the form of a flywheel 11 bolted, as at 12, to the flange 13 of a crank shaft 14, the latter representing any suitable source of power, such as an internal combustion engine. A driven part 17, which includes a driven shaft 18, is disposed in axial alignment with the crank shaft 14, and is adapted to be connected to and driven from the flywheel 11 through suitable clutch mechanism, indicated in its entirety by the reference numeral 20, which forms the principal subject matter of the present invention.

The clutch mechanism consists of a clutch disc 25, best shown in Figure 3, which includes a central disc section proper, indicated by the reference numeral 26, and a plurality of circumferentially directed fingers or links 27, preferably but not necessarily formed integral with the clutch disc 26. The links 27 are generally arcuate in configuration, and are rigidly fastened to or formed as a part of the clutch disc 26. While the arms or links 27 are shown as arcuate on a radius having the clutch axis as a center, it will be understood that the center of this radius may be shifted and the curvature may be greater or smaller and the curvature of the junction may be made on a larger radius, depending on the degree of wabble plate action which is to be encountered and upon the amount of extensible elasticity desired. Also, the arms or links 27 may be made additionally extensible as by corrugation of the links in whole or in part. Preferably, the connection with the clutch disc 26 is made at one end of each of the links 27, and at the point where the inner edge of the link merges into or joins the outer edge of the disc the metal is cut on a curve, indicated at 28, whereby the stresses due to the yielding or flexing of the link relative to the disc will not be concentrated at any one point but will be distributed along the curved edge to an extent sufficient to prevent the metal from tearing or fracturing, as will be referred to later. The outer or free end of each of the links is apertured, as best shown in Figures 1 and 3, and receives an attaching bushing 30, one end of which carries a head 31 and the other end of which is riveted over a collar 32, the head 31 and collar 32 being on opposite sides of the end of the finger 27. The bushing 30 is hollow and receives an attaching cap screw 34 that is adapted to be screwed into a threaded opening 35 in the flywheel 11. The clutch disc 26 carries the usual friction lining 37 which is secured thereto in any suitable manner, as by rivets 38.

The driven section of the clutch mechanism 20 is indicated in its entirety by the reference numeral 40 and includes a pair of relatively movable clutch plates 41 and 42 disposed on opposite sides of the driving clutch disc 25. The outer driven clutch plate 42 includes a hub section 45 that is adapted to be mounted upon the tapered end 46 of the driven shaft 18. The driven clutch plate 42 is adapted to rotate with the driven shaft 18 by means of a key 47 or the like, and the hub 45 is held in position on the forward end of the driven shaft 18 by means of a nut 50 and a locking set screw 51. The hub 45 of the driven clutch plate 42 extends forwardly, as at 45a, and forms a flange or hub section over which the inner driven clutch plate 41 is disposed for axial movement relative to the outer clutch plate 42, as will be described below.

A shift collar 60 is mounted over the driven shaft 18 at the outer end of the hub 45, and includes a rim portion 61 that is provided with a number of openings 62 and a number of spring receiving sockets 63 in which the outer ends of springs 64 are seated. A spacer 67, having threaded holes in each end, is attached to the collar 60 by socket head cap screws 68 that extend through the openings 62. The spacers 67 have lugs at 69 which engage milled slots in the collar 60, whereby the spacers are prevented from turning. Each spacer 67 extends axially inwardly through an opening 70 in the driven clutch plate 42 and partially into an opening 71 formed in the inner driven clutch plate 41 and registering with the opening 70 in the outer clutch plate. A socket cap screw 72 serves to fasten the inner end of each of the spacers 67 to the inner or shiftable clutch plate 41. The inner ends of the springs 64 are received in sockets 75 formed in the outer face of the outer driven clutch plate 42. An insulating washer 76 is placed in the bottom of each of the spring receiving sockets 75 to protect the springs from the detrimental effect of heat generated when the clutch slips. The two driven clutch plates 41 and 42 and the flange 61 of the shift collar 60 have registering openings 77, 78 and 79, to facilitate cooling the clutch and to provide for a flow of air through the ends of the springs.

As will be clear from the above description, the springs 64 react against the driven clutch plate 42 and exert a force axially outwardly against the shift collar 60, and the latter in turn exerts a pull through the spacers 67 and cap screws 68, 72 and moves the inner driven clutch plate 41 axially outwardly to clamp the driving clutch disc 25 securely and firmly therebetween.

The inner end of the driven part 17 is supported on the adjacent end of the driving part 10 by a bearing unit of the self-aligning type that is disposed in the plane of the clutch disc 26. A collar 85 has a number of radially outwardly extending lugs 86 that are apertured to receive bolts 87 by which the collar 85 is secured to the flywheel 11. The collar 85 includes a generally cylindrical section 89 that is disposed in axial alignment with the crank shaft 14 and serves as a support for the inner race 93 of the self-aligning bearing unit 94. The inner race 93 carries two rows of anti-friction balls 95, and an outer race 96 is provided and has a generally spherical bearing surface, the center of which lies in exact alignment with the axis of the crank shaft 14, this point coinciding with the point where the plane of the clutch disc 26 intersects the axis of the crank shaft 14. Preferably, the outer bearing race 96 seats in a recess 100 formed in the flange section 45a of the driven clutch plate 42. A plate 101 closes the space between the inner and outer ball races 93 and 96, and a spring ring 103 seats in a groove in the flange 45a and serves to hold the bearing unit 94 in position in the hub of the driven clutch plate 42.

The driven shaft 18 is supported adjacent its outer end by anti-friction bearing means 110 which is carried in the nose 111 of a clutch housing 112. The portion 111 of the clutch housing 112 is provided with a recess 115 which receives a collar or stationary cam member 116, the latter being held rigidly in the clutch housing 112 by means of a set screw 117 or any other suitable means. A cam member 120 surrounds the driven shaft 18 inwardly of the stationary member 116, and both the latter and the member 120 are provided with camming surfaces 121 and 122. A thrust ring 124 is disposed between the inner face of the member 120 and the shift ring 60. A lug 125 is formed on the cam member 120 and receives a link 126 that is adapted to be shifted by any suitable clutch operating mechanism. When the member 120 is rocked about the axis of the driven shaft 18, the camming surfaces 121 and 122 cause the member 120 to exert an inwardly directed thrust against the shift ring 60, and the latter acts through the spacers 67 to force the inner driven clutch plate 41 inwardly and release the driving clutch disc 26. It will be noted that the member 42, against which the springs 64 bear, is rigidly fastened to the driven shaft 18, and that the latter is supported by the bearing means 110 against axial displacement relative to the clutch housing 112. It will also be noted that when the member 120 is rocked to disengage the clutch, it reacts against the stationary member 116 which is fixed in the recess 115 in the clutch housing 112. Therefore, all of the forces and reactions involved in engaging and disengaging the clutch are self-contained in that none of the forces are imposed upon the self-aligning pilot bearing unit 94 or the associated flywheel.

A sleeve 130 has bearing support in the member 116 and out of contact with the driven shaft 18. The sleeve 130 is threaded into the cam member 120 and extends axially outwardly along the driven shaft 18 to a point adjacent the collar 131 which holds the bearing 110 in position on the driven shaft 18. A flange 132 is formed on the outer end of the sleeve 130, and a spring 134 is positioned between the stationary cam member 116 and the flange 132, the force of the spring 134 being exerted to hold the cam member 120 up against the stationary cam member 116, whether the clutch is engaged or disengaged. This relieves the thrust ring 124 of undue wear.

In operation, the clutch may be engaged and disengaged by rocking the shifting cam member 120 in one direction or the other, in the manner set forth above. The bearing unit 94 maintains the clutch parts in accurate concentric relation with respect to the axis of the crank shaft 14, independently of any misalignment that may exist between the crank shaft 14 and the driven shaft 18, as might occur if the bearing 110 or the clutch housing 112 supporting it should be out of position, or from any other cause. If the driven shaft 18 is angularly misaligned with respect to the crank shaft 14, the bearing parts will be rocked about a central point, defined by the self-aligning bearing unit 94, and the flexible links or fingers 27 will be deflected laterally, due to the tilt of one clutch part with respect to the other while both are rotating. Also, the links are stressed in tension longitudinally or generally circumferentially when the parts are angularly misaligned because at any one instant the distance between the point 34 where one link is connected to the flywheel and the point where the link joins the clutch disc is slightly different from the corresponding distance for every one of the other links except the diametrically opposite link. The curved edges of the links and the curved junctions 28 effectively prevent the stretching and deflecting actions from tearing the links apart or tearing them away from the plate, since the stresses are distributed along the curves above referred to. Further, there will be no tendency for the driving disc 25 to shift radially relative to the driven clutch plates, due to the support of the clutch parts about their point of rocking that coincides with the axis of rotation of the crank shaft 14. The fingers or links 27 are extended circumferentially from their points of attachment to the clutch disc proper to their points of attachment to the flywheel 11 a sufficient distance so as to secure sufficient flexibility under all conditions of operation. It will be noted from Figure 3 that the links or fingers 27 are generally arcuate members. By virtue of this arrangement, these fingers or members transmit the driving torque from the flywheel, which rotates in the direction of the arrow shown in Figure 3, to the driving clutch disc 25 with a certain amount of cushioning or yielding, due to the tendency of the transmitted force to straighten the normally arcuate members 27. This tendency to straighten the members 27 imposes tensile stresses on the inner portions and compressive stresses on the outer portions. As will be obvious, of course, the members 27 are freely flexible laterally so as to accommodate rocking of the clutch parts about the center of the self-aligning bearing unit 94. It may be desirable, however, to limit the amount of yielding in a circumferential direction that the members 27 may have, and to this end the present invention contemplates the provision of a plurality of openings 140 in the clutch disc, preferably adjacent the points of attachment of the flexible sections 27 to the clutch disc proper, and in the openings 140 are disposed pins or studs 141 which are carried in any suitable manner by the flywheel 11. As will be clear, the amount of yielding or straightening that is permitted to occur in the members 27 is limited by the engagement of one side or the other of the opening 140 with the pin 141 disposed therein. As shown in Figure 3, preferably the members 27 extend circumferentially in the direction in which the flywheel 11 transmits the driving force to the clutch disc, whereby the link members 27 act largely in tension. However, if there should exist any tendency for the load to drive the motor, the links 27 will act in compression, limited, however, by the amount of relative movement permitted, in either direction, by the pins 141 in the openings 140. As is obvious, the amount of permissive movement is determined by the relative sizes or diameters of the pins 141 and the openings 140.

When the clutch disc 26 is manufactured the fingers or links 27 are deflected out of the general plane of the disc and are given a permanent set so that normally the ends of the spring fingers 27 tend to take a position even farther to the right of the plane of the clutch disc 26 than is shown in Figures 1 and 4. Therefore, when the clutch is assembled and cap screws 34 drawn up, the clutch disc 26 tends to move inwardly to the left (Figure 1) away from the driven plate 42 so that when the shiftable plate 41 is moved inwardly to disengage the clutch, the clutch disc 26 first moves out of engagement with the driven plate 42, continued inward movement of the clutch plate 41 carrying the latter out of engagement with the driving clutch disc 26, whereby there is no tendency for the clutch to drag. When the linings 37 wear down, however, the spring fingers 27 may lie substantially in the plane of the disc when the clutch is engaged, and when the linings are worn down almost to the rivets 38 the fingers 27 may be deflected away from the plane of the disc 26 in the other direction, as indicated in Figure 2, when the clutch is engaged. The purpose of this arrangement is to minimize the effect of having the clutch fingers slightly at an angle to the driving disc when the clutch is engaged, for it is only when the clutch linings are very new or when they are quite worn that the deflection of the fingers 27 is appreciable when the clutch is engaged. In any event, however, the resiliency of the fingers 27 tends to hold the clutch disc proper away from the driven clutch plate 42 when the clutch is disengaged.

If it is desired to provide for greater circumferential resilience than is possible in the construction shown in Figure 3, the fingers 27 may be corrugated transversely, as indicated by the reference numeral 150 in Figure 5. This figure also shows a modified form of motion limiting means which prevents the flywheel from rotating more than a certain amount relative to the driving clutch disc. As shown in Figure 5, the link or finger 27a is provided with an inwardly directed projection 152 which is received in a correspondingly formed slot or recess 153 cut in the peripheral edge of the clutch disc 26a. It will be remembered that the bushing 31, which is fastened to the free end of the spring link, is fastened to the flywheel 11. Therefore, when the flywheel 11 rotates with respect to the clutch disc 26a a certain amount, the walls of the projection 152 will engage the walls of the notch 153 in the clutch disc, thereby preventing any further relative movement between the flywheel and the clutch disc in a circumferential direction. It is not necessary that every spring link 27a have the above described projection 152 seating in a recess 153 in the clutch disc, and similarly it is not necessary that there be as many pins 141 and recesses 140 in Figure 3 as there are spring links 27. Any suitable member may be provided.

In both forms of clutch discs described above, the flexible or resilient links or fingers have been shown as formed integrally with the clutch disc proper. Such integrality is not, however, necessary. The laterally flexible links may be made as separate parts if desired.

While I have shown and described above the preferred means in which the principles of the present invention have been illustrated, it is to be understood that my invention is not to be limited to the particular details shown and described above, but that, in fact, widely different means may be employed in the practice of the broader aspects of my invention.

What I claim, therefore, and desire to secure by Letters Patent is:

1. In a clutch, a driving part, a driving clutch disc, and flat arcuate links disposed generally in the plane of said disc and each connected at one end to said disc and at the other end to said driving part, said links extending from their points of connection with the disc in the direction in which power is applied by the driving part to the disc and said links being adapted to yield slightly, by virtue of their arcuate configuration, under the influence of impressed driving force tending to straighten the arcuate links but being sufficiently rigid, by virtue of being flat, so as to transmit appreciable amounts of power in the other direction.

2. Clutch mechanism adapted to connect driving and driven parts, comprising a driving clutch disc having integral fingers extending circumferentially of the disc from the point of connection between the fingers and the disc, means rigidly connecting the free ends of said fingers to said driving part, said clutch disc being movable relative to the driving part due to the yielding of said fingers, a driven clutch member adapted to be engaged with said driving clutch disc and rigidly carried by said driven part, there being a plurality of apertures in the portions of said fingers which are integrally connected with said disc, and a plurality of pins carried by said driving part and extending into and having a diameter smaller than the diameter of said openings, thereby providing for a limited amount of rotation of the clutch disc relative to the driving part.

3. Clutch mechanism adapted to connect driving and driven parts together, comprising a driving clutch disc having a plurality of integral laterally flexible fingers having their free ends extending generally circumferentially of the clutch and formed with a projection thereon extending generally radially inwardly, means fastening the free ends of said fingers to said driving part, and a driven clutch member adapted to be engaged with said clutch disc and rigidly carried by said driven part, there being a notch in the clutch disc to receive said projection, whereby the relative rotation between the clutch disc and the driving part to which it is connected through said resilient fingers is limited by the engagement of at least one of said projections in the notch associated therewith.

4. A clutch adapted to connect driving and driven parts, comprising a clutch plate having a plurality of arms extending generally circumferentially from their points of connection with the plate and adapted to have their free ends fixed in spaced relation to one of said parts, said arms being integral, respectively, with the portions of the clutch plate to which they are connected, and a companion clutch member engageable with said clutch plate and connected to rotate and move angularly with the other of said driving and driven parts, said integral arms being arcuate so as to possess sufficient extensible elasticity to provide for various changes in distance between said points of connection and said relatively fixed points so as to accommodate tilting of said plate relative to said one part about a transverse radial axis.

5. Clutch mechanism adapted to connect driving and driven parts, comprising the combination of pilot bearing means connecting said parts for relative rotation and constraining any misalignment to take place angularly about said bearing means as a center, a clutch plate disposed in a plane passing through the center of said bearing means and provided with a plurality of arcuate arms connected with the adjacent portions of the plate and extending generally circumferentially, companion clutch plate means engageable with said clutch plate and movable angularly about said center with one of said driving and driven parts, and means securing the free ends of said arms to the other of said parts in fixed spaced relation, the arcuate formation of said arms imparting sufficient extensible elasticity thereto to accommodate rocking movement of said clutch plate about a transverse radial axis.

6. A clutch adapted to connect driving and driven parts, comprising a driving clutch disc having a plurality of arms integral, respectively, with the adjacent portions of the disc and extending generally circumferentially, the outer ends of said arms being adapted to be attached to said driving part in fixed spaced relation, a pair of driven clutch plates adapted to engage opposite sides of said driving clutch disc and fixed to move axially and angularly with said driven part, said integral arms being arcuate substantially from their points of connection with the clutch disc to said fixed points of attachment so as to provide an amount of resiliency both circumferentially and transversely of the clutch disc to permit the latter to move axially toward and away from said driving part and to move angularly with said driven part and accommodate angular misalignment between the driving and driven parts.

7. In a clutch, a clutch plate having a plurality of arms extending generally circumferentially in the same direction peripherally of the plate, each having its outer end free and connected at its other end to the plate, each arm being arcuate between its ends to impart extensible resiliency thereto to provide for tilting the plate about an axis in the plane thereof while the ends of the arms are fixed in spaced relation.

8. A disc clutch adapted to connect driving and driven parts, comprising a plate member connected to one of said parts and held against axial displacement with respect thereto, a second plate member shiftable axially relative to said one part, and a clutch disc member having spring fingers serving to connect the disc member with the other of said driving and driven parts, such spring fingers being so biased and connected to said other of said parts as to exert a force acting to move the disc member axially away from said first plate member when the clutch is disengaged.

9. A disc clutch adapted to connect driving and driven parts, comprising a plate member connected to one of said parts and held against axial displacement with respect thereto, a second plate member shiftable axially relative to said one part, and a clutch disc member having circumferentially extending spring arms serving to resiliently connect the clutch disc member to the other of said driving and driven parts, said fingers being normally deflected away from the general plane of the disc member and connected to said other part so as to hold the disc member away from the clutch plate members, both when the clutch lining is new and when the clutch lining is worn.

10. A new article of manufacture comprising a clutch disc having a plurality of generally circumferentially directed attaching fingers, said fingers being generally arcuate so as to have a certain amount of longitudinal extensibility and having outer end portions which are formed so as to lie radially outwardly of the clutch disc and normally in a plane spaced from the general plane of said disc.

11. A new article of manufacture comprising a clutch disc having a plurality of generally circumferentially directed attaching fingers, each joined integrally at one end to the disc by a portion which is curved so as to distribute the stresses arising from the flexure of the fingers relative to the disc.

12. A clutch adapted to connect driving and driven parts, comprising a clutch disc, a plurality of arms, each rigidly connected at one end to said disc by a curved section and extending generally circumferentially therefrom, the free ends of said arms being fixed in spaced relation to one of said parts, and a companion clutch member engageable with said clutch disc and connected to rotate and to move angularly with the other of said driving and driven parts, said arms being formed to have sufficient extensible elasticity to provide for various changes in distance between said curved sections and said relatively fixed points so as to accommodate tilting of said disc relative to said one part about a transverse radial axis, the curved section serving to distribute stresses arising between the disc and said arms due to flexure and extension of the latter in operation.

CLARENCE M. EASON.